United States Patent

Putman et al.

[11] 3,973,410
[45] Aug. 10, 1976

[54] DISC-TYPE AUTOMATIC EXPANSION VALVE FOR REFRIGERANT

[75] Inventors: Thomas H. Putman, Pittsburgh; Francis T. Thompson, Murrysville, both of Pa.

[73] Assignee: White-Westinghouse Corporation, Cleveland, Ohio

[22] Filed: Apr. 18, 1975

[21] Appl. No.: 569,479

Related U.S. Application Data

[63] Continuation of Ser. No. 383,427, July 27, 1973, abandoned.

[52] U.S. Cl. .................... 62/527; 62/222; 137/517; 137/859; 138/45
[51] Int. Cl.² .................................. F25B 41/06
[58] Field of Search ................... 62/222–224, 62/527; 137/625.28, 625.3, 625.33, 498, 501, 517, 525; 138/44, 45.

[56] References Cited
UNITED STATES PATENTS

| | | | |
|---|---|---|---|
| 1,786,110 | 12/1930 | Gunn | 62/222 |
| 2,481,968 | 9/1949 | Atchison | 62/222 |
| 3,110,527 | 11/1963 | Fox | 308/122 |

*Primary Examiner*—William E. Wayner
*Assistant Examiner*—William E. Tapolcai, Jr.
*Attorney, Agent, or Firm*—Strauch, Nolan, Neale, Nies & Kurz

[57] ABSTRACT

An automatic expansion valve for controlling refrigerant flow from a condenser to an evaporator in which the valve includes an apertured deflectable disc which defines the refrigerant expanson orifice with other structure within the valve, and with the flow passage arrangement in the valve body being such as to subject the upstream face of the disc to the pressure of the liquid refrigerant, and the downstream face of the disc to the pressure of the expanded vaporous refrigerant so that the disc deflects in accordance with the differential pressure on the opposite faces and accordingly effects changes in the effective opening of the expansion orifice.

7 Claims, 8 Drawing Figures

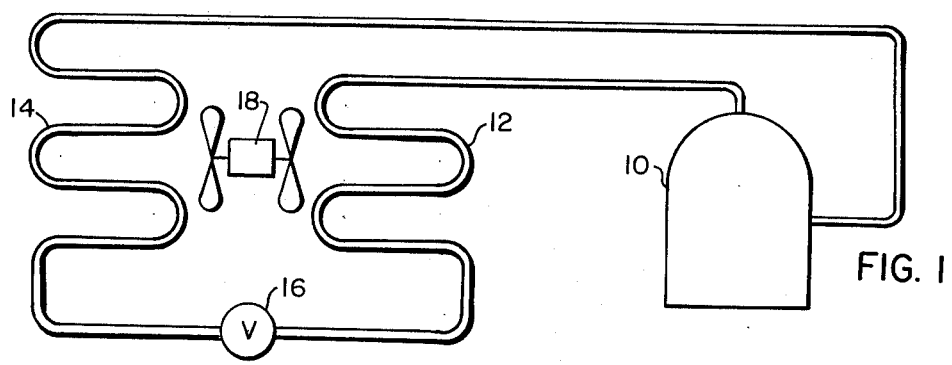
FIG. 1
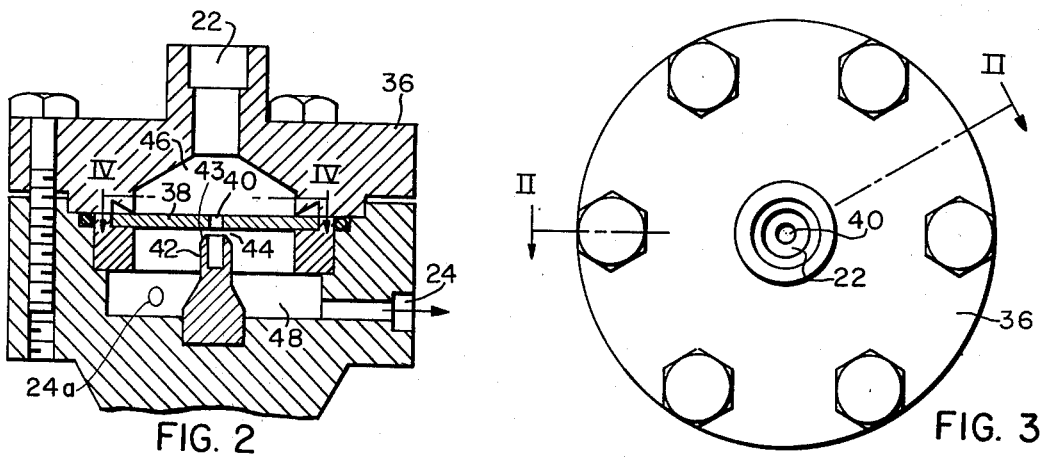
FIG. 2
FIG. 3
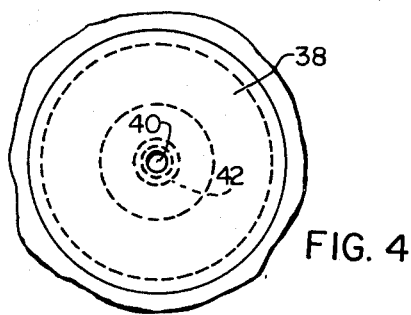
FIG. 4
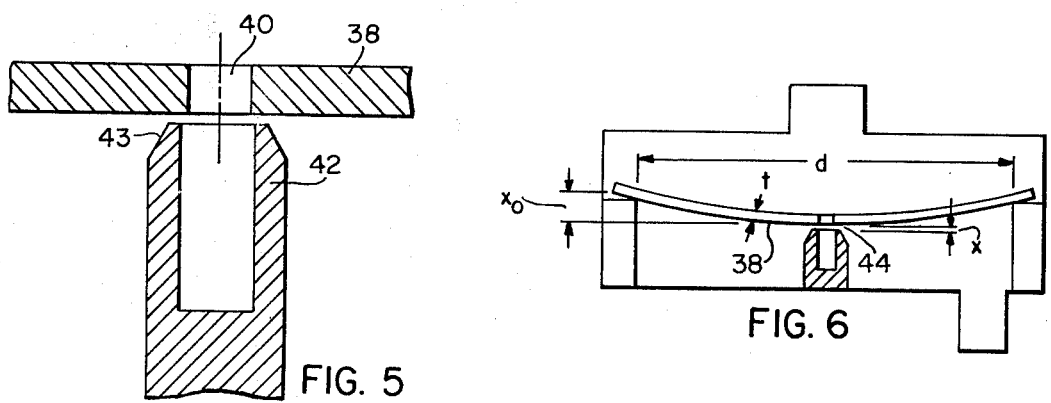
FIG. 5
FIG. 6

PRESSURE — DEFLECTION CURVES FOR DISC-TYPE VALVE

DISC-TYPE AUTOMATIC EXPANSION VALVE FOR REFRIGERANT

This application is a continuation of application Ser. No. 383,427, filed July 27, 1973, now abandoned.

CROSS-REFERENCE TO RELATED APPLICATION

Putman U.S. patent application Ser. No. 383,425, filed July 27, 1973, is a related application in that it discloses and claims the basic invention upon which this invention is considered to be an improvement.

BACKGROUND OF THE INVENTION

1. Field of the Invention

The invention relates to the art of refrigerant expansion valves.

2. Description of the Prior Art

One commonly used automatic expansion valve for controlling the flow of refrigerant between a condenser and an evaporator is called a constant pressure refrigerant expansion valve and is designed to attempt to keep a constant absolute pressure in the evaporator during operation of the system. This valve is typically operated by a preset spring force and a force derived from the feedback of the pressure from the evaporator. The valve is arranged so that with the valve set and feeding refrigerant at a given pressure, a small increase in the evaporator pressure will act to move the valve toward a closing direction, thereby restricting the refrigerant flow and limiting the evaporator pressure. When the evaporator pressure drops below the valve setting because of a decrease in load, the valve moves in an opening position to increase the refrigerant flow in an effort to raise the evaporator pressure to the particular balanced valve setting. In a number of applications of the valve, including some room air conditioners, the valve is provided with a bypass in the form of a small slot or drilled hole in the valve seat or valve pin to prevent complete valve close-off when the compressor shuts down. This is to permit refrigerant to continue to flow at a reduced rate until high and low side pressures are equalized.

While the bypass type valve provides for the equalization after several minutes, it is believed that the bypass itself contributes to a problem which occurs when an air conditioner is operated without any forced air flow over the evaporator and condenser. In such an arrangement using a constant pressure bypass type valve, and starting with the system pressures equalized, but with the fans not operating, the valve remains closed and gives a bypass feed only. If this occurs in a system using an expansion valve which also includes a relief valve, and with, say, R-22 refrigerant, the relief valve will open at say a 600-700 p.s.i. differential so that refrigerant can then flow to the compressor and load it sufficiently that the current and temperature overload means will be operated to shut the compressor down. However if the expansion valve does not include the relief value, the condenser pressure can build up to a valve of up to 200 p.s.i. over what would be desirable before the current and temperature overload of the compressor operates. It is believed that if the bypass in the expansion valve were omitted, it is likely that the high pressure problem would be avoided. However this would not permit equalization of the system after shutdown.

The valve according to the invention is considered to be preferable in that no bypass arrangement is needed for equalization, and under a fan failure condition the valve functions in a manner which does not create any problems for the air conditioning system itself.

Of the prior art patents of which applicant is aware, U.S. Pat. No. 1,786,110 is considered to be the closest in the field of refrigerant expansion valves, but differs substantially in that it in effect includes two valves, one of which functions as an on-off valve, while the other functions like a capillary tube; neither of which corresponds to the operation of the valve of applicants' invention.

Flow control devices for controlling the flow of lubricant to hydrostatic bearings and similar in structure to the valve arrangements embodying this invention are disclosed in U.S. Pat. No. 3,110,527. However these devices are incorporated in a system where an increase in differential pressure between a source pressure and the load pressure is taught to result in a restriction of the flow which would be directly the opposite of the result of the operation of the refrigerant expansion valve of this invention.

SUMMARY OF THE INVENTION

In accordance with this invention, the refrigerant expansion valve includes a valve body having a disc-shaped deflectable member supported at its periphery from the valve body and separating the interior of the valve body into an upstream space and a downstream space, the disc-shaped deflectable member being provided with a generally centered aperture, the valve body also having structure therein spaced relatively closely to that part of the deflectable members defining the aperture so that the structure defines, with the aperture defining part, an annular refrigerant expansion orifice therebetween, the upstream space in the valve body confining the liquid refrigerant in its passage through the valve and thereby subjecting the upstream face of the member to the pressure of the liquid refrigerant, and with the downstream space in the valve confining the expanded vaporous refrigerant in its passage and thereby subjecting the downstream face to the pressure of the expanded vaporous refrigerant, so that the deflection of the deflectable member and correspondingly the change in the effective opening of the orifice is in accordance with changes in the differential pressure of the liquid and expanded vaporous refrigerant.

As is noted in the companion Putman patent application, it is emphasized that the differential pressure across the expansion valve is used to control the refrigerant flow area of the valve so that the quantity of flow is a function of the difference between the supply (condenser) and outlet (evaporator) pressures, rather than simply being a function of the pressure in the evaporator as is the case with the constant pressure refrigerant expansion valves.

DRAWING DESCRIPTION

FIG. 1 is a schematic representation of an air conditioning system in which the invention may be incorporated;

FIG. 2 is a sectional view of the expansion valve according to the invention and corresponds to a view taken along the line II—II of FIG. 3;

FIG. 3 is a plan view of one form of the valve;

FIG. 4 is a sectional view corresponding to one taken along the line IV—IV of FIG. 2;

FIG. 5 is an enlarged fragmentary view illustrating the general relationship between the part of the disc including the aperture and the facing nozzle-shaped structure;

FIG. 6 is a schematic representation of a refrigerant expansion valve of the type having an apertured disc-shaped deflectable member for reference in connection with selecting specific values in accordance with a design example;

DESCRIPTION OF THE PREFERRED EMBODIMENT

Figure 7:
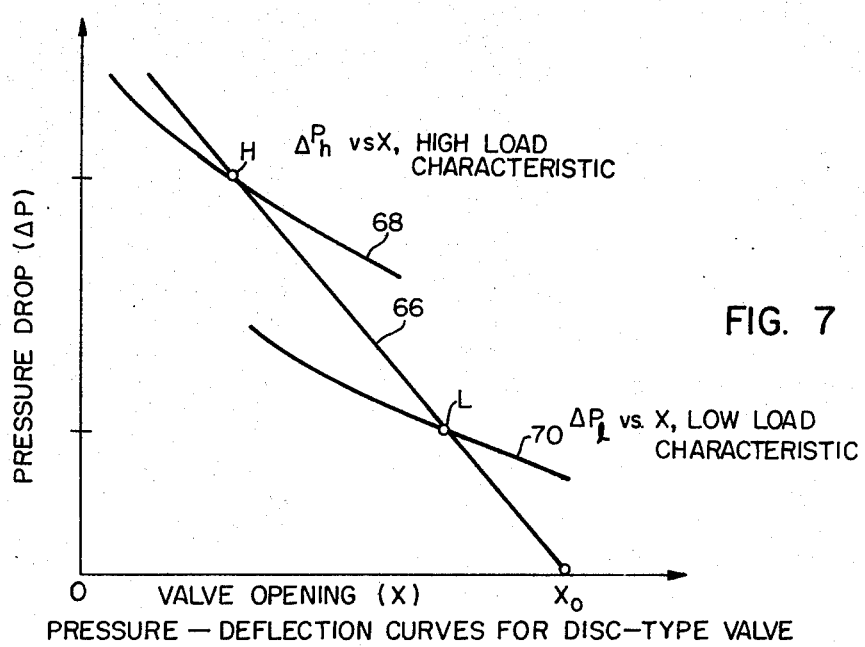
FIG. 7 is a graphical representation illustrating the general relationship between pressure drop and valve openings for a typical air conditioner for purposes of explaining the design example.

The same general principles in the design of the valve forms disclosed in the companion noted patent application, and the form of valve of this invention are applicable, and accordingly reference should be had to the noted patent application for the fullest understanding of these general principles.

In FIG. 1, the schematically illustrated refrigerant system includes a compressor 10, condenser 12, evaporator 14, the connecting refrigerant lines between these components, an expansion device 16 in the line between the condenser and evaporator, and a fan-motor assembly 18 for supplying separate flows of air over the condenser and evaporator as is conventional in air conditioning systems.

An example of a currently preferred form that the valve according to the present invention may take is shown in FIGS. 2–5. The hollow valve body 36 is provided with an inlet 22 adapted to be connected to a refrigerant system condenser, and one or more outlets 24 and 24a adapted to be connected to a refrigerant system evaporator. The hollow interior of the valve body contains a flexible disc-shaped member 38 supported at its periphery by the valve body 36 and having a generally centered aperture 40. The structure 42 which is supported from the valve body base and which with the member 38 defines the expansion orifice 44 has an upper chamfered end 43 which is similar in shape to a nozzle structure and accordingly is so termed the nozzle structure 42. The annular expansion orifice 44 is defined between the upper rim of the nozzle structure 42 and the bottom rim of the aperture 40. With this arrangement the space 46 on the upper side of the disc 38 is subject to the liquid refrigerant supply pressure from the condenser, while the lower space 48 below the disc is subject to the expanded vaporous refrigerant pressure. As will be apparent hereinafter, the aperture 40 is large enough relative to the annular expansion orifice 44 that the expansion takes place in the passage of the refrigerant through the orifice 44.

As noted in the companion patent application, it is believed that the arrangement of the valve as shown in FIG. 2, in which the entire opposite faces of the disc 38 are subject to the different pressures, is advantageous in that this is believed to reduce the likelihood of flow induced vibrations requiring dampening of the flexible member. The theory is that a pumping type action would arise from vibration of the disc and this would be self-dampening. Also, since the differential pressure ie effective over virtually the total disc area, it is believed that the valve can likely be operated at higher force levels with less uncertainty (on a percentage basis) about the area the pressure differential acts upon. Additionally, any potential problem from deformation of the lower part of the valve body is reduced since it is acted upon by the outlet pressure, which is substantially lower than the supply pressure. Finally, it will be appreciated that since the entire lower space 48 contains expanded refrigerant, multiple outlets from the space can be accommodated more easily than where the upper end of the nozzle structure 42 constitutes the inlet to the outlet passage from the valve. The use of multiple outlets from the lower space 48 can be advantageous where the valve is to be used for multiple evaporator circuit applications.

In the arrangement described, the upper face of the disc is subject to the liquid refrigerant supply pressure, while the lower face of the disc is subject to the pressure of the expanded vaporous refrigerant. Based upon the total area of the faces of the disc subject to the pressure producing the forces causing deflection, slight differences in the diameter of the aperture 40, and the diameter of the upper end of the nozzle structure 42 are of little significance with respect to the forces applied to cause deflection of the disc. With the arrangement described, the change in differential pressure across the expansion orifice (which corresponds substantially with the changes in the differential pressure between the condenser and evaporator) results in changes in the deflection of the disc and accordingly results in changes in the effective opening of the expansion orifice 44.

In the operation of the valve described, under a high load condition for an air conditioning system the pressure differential between the condenser and evaporator is greater than when the system is operating under rated conditions, or under a low load condition. Under the high load condition, the greater differential pressure causes greater deflection of the disc, and accordingly results in an effective expansion orifice which is smaller than at the other conditions. The converse is of course also true in that the effective opening of the orifice is greater when the load is less, due to the lesser differential pressure.

In designing a valve to carry out the invention, the designer starts with knowledge of the desired pressure drop across the valve for, say, two of three conditions such as high load, rated load, and low load, and then can determine the required valve openings for two of the three conditions. That is, the valve is designed so that its characteristic is such that it passes through two selected points on a plot of differential pressures versus valve openings. The way in which a valve such as that illustrated in FIG. 2 is designed and calculated is described in the following.

The basic parts of the described expansion valve are the deflectable disc 38 and the expansion orifice 44 as are shown schematically in FIG. 6. The concept of using this valve as a refrigerant control device is based on the pressure and flow rate characteristics of a selected air conditioner system. The notations below are defined for the purpose of the calculations which follow, and which are intended to explain an example of the underlying theory and design procedure for a particular valve.

$P_1$ = psi, inlet pressure
$P_2$ = psi, outlet pressure
$\Delta P = P_1 - P_2$ = psi, pressure drop across the valve $x$ = in., orifice opening
$x_o$ = in., value of $x$ when $\Delta P = 0$
$d$ = in., disc diameter of faces of disc subject to pressure (selected as 1.0")
$A$ = in.$^2$, effective orifice area
$K$ = lb/in., disc stiffness
$t$ = in., disc thickness
$n$ = in., nozzle diameter (selected as 0.110")
$r$ = in., disc aperture radius (selected as 0.0475")
$Q$ = f$^3$/sec, discharge flow rate
$C_d$ = discharge coefficient
$\rho$ = slug/ft$^3$, fluid density
$f$ = lb, force on the disc
$W$ = lb, total applied load
$y = x_o - x$ = in., vertical deflection
$E$ = psi, modulus of elasticity Subscripts $h$ and $l$ denote the high and low load conditions, respectively.

The force acting on the disc body can be expressed by $f = (\pi/4) d^2 \Delta P$. Also, the force can be expressed in terms of disc stiffness and deflection, i.e., $f = Ky = K(x_o - x)$. Hence, $(\pi/4) d^2 \Delta P = K(x_o - x)$ or $$\Delta P = (4/\pi)(K/d^2)(x_o - x) = m(x_o - x) \quad (1)$$

where $$m = (4/\pi)(K/d^2)$$

From Equation (1) it may be seen that the valve opening is related to the pressure drop across the valve. This relationship is also graphically illustrated by the straight line valve characteristic line 66 in FIG. 7.

Line 68 of FIG. 7 illustrates a typical shape of a curve of values of pressure drop versus valve opening that can be obtained by adjusting the valve opening of a manually adjustable expansion valve of an air conditioner operated under a high load condition while measuring the corresponding pressure drop. Line 70 of FIG. 7 illustrates a typical shape of a curve for operation under a low load condition.

The valve designer has control over the slope and the $x$ intercept of the valve characteristic. Therefore, as illustrated in FIG. 7, it is theoretically possible to design the valve to satisfy any high load and low load pressure drop requirements (i.e., by operation at points H and L) so long as these requirements are consistent with other constraints of the valve design.

Although the above discussion has been based upon meeting specified high load and low load operating points, by design the valve can as well meet specified high load and rated load, or low load and rated load points. Since there are only two independent design parameters, the slope and the intercept, the design cannot generally meet independently specified high load, rated load, and low load operating pressure drops. However, from a practical point of view it is not necessary to meet three independent conditions.

The following paragraphs give a numerical example of how to design a valve to meet high and low load conditions for a specific room air conditioner charged with R-22 refrigerant and having a nominal 15,000 BTU per hour rating. The values set forth in the table below are those measured and calculated from the operation of such an air conditioner provided with a conventional automatic expansion valve.

|  | Low Load Conditions | Rating Conditions | High Load Conditions |
|---|---|---|---|
| Pressure Drop P (psi) | 142 | 253 | 322 |
| Flow Rate (lb/hr) | 203 | 209 | 244 |
| Density before Valve (Slug/ft$^3$) | 2.225 | 2.190 | 2.145 |
| Flow Rate (cfs) | 7.90 × 10$^{-4}$ | 8.24 × 10$^{-4}$ | 9.05 × 10$^{-4}$ |

From the standard orifice equation, the effective expansion orifice area $A$ is found for high and low load conditions, as follows:

$$A_h = \frac{Q_h}{C_d \sqrt{\frac{2\Delta P_h}{\rho_h}}} = \frac{9.05 \times 10^{-4}}{0.611 \sqrt{\frac{2 \times 322 \times 144}{2.145}}} = 7.12 \times 10^{-6} \text{ ft}^2$$

$$= 0.00103 \text{ in}^2 \quad (2)$$

$$A_l = \frac{Q_l}{C_d \sqrt{\frac{2\Delta P_l}{\rho_l}}} = \frac{7.9 \times 10^{-4}}{0.611 \sqrt{\frac{2 \times 142 \times 144}{2.225}}} = 9.55 \times 10^{-6} \text{ ft}^2$$

$$= 0.00137 \text{ in}^2 \quad (3)$$

where $C_d = 0.611$ is obtained from FIG. 85 of the reference book of H. Rouse entitled "Elementary Mechanics of Fluids," published by John Wiley and Sons, 1960.

The nozzle diameter is selected to be 0.110 in. to get reasonable values of $x$ for high and low load conditions.

$$x_h = (A_h/\pi n), \; x_l = (A_l/90_n)$$

Then, $x_h = 0.00298$ in., and $x_l = 0.00397$ in.

The ratio of the area of disc aperture $\pi r^2$ and the area of effective orifice $(\pi n x_l)$ at low load conditions is 5.16. This area ratio is large enough so that the annular opening is the principal restriction and controls the expansion.

Figure 8:
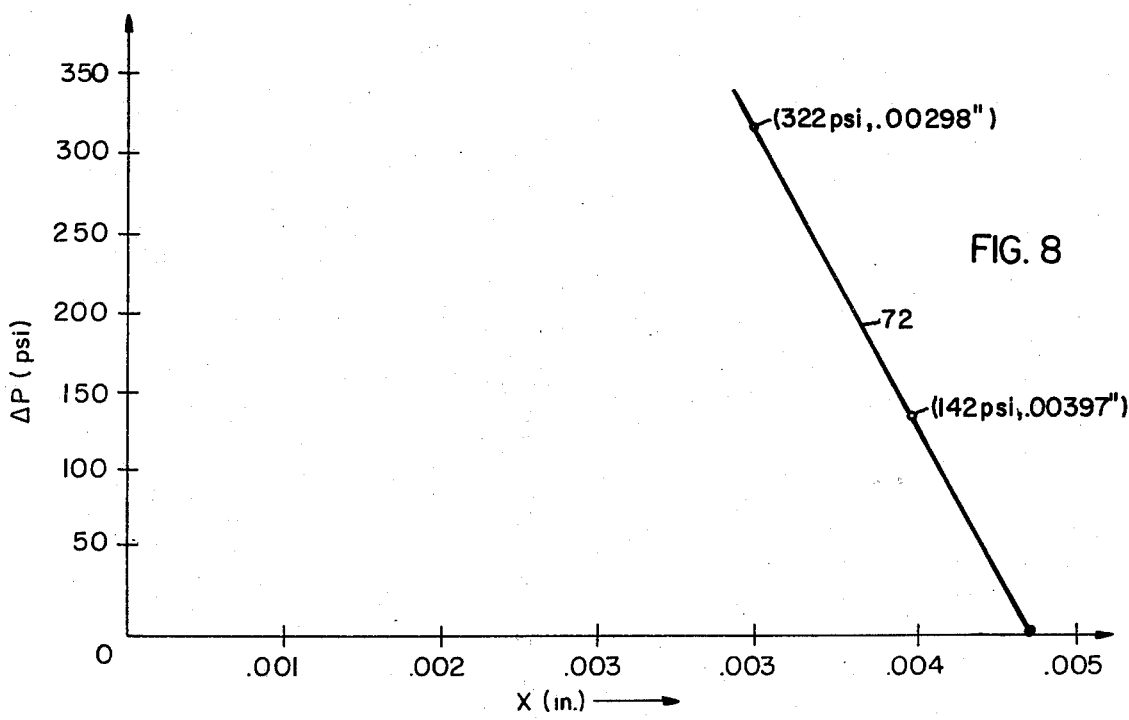
FIG. 8 is a graphical representation of pressure drop versus valve opening for the design example for a specific room air conditioner.

By plotting the high and low load operating points in a $\Delta P$ versus $x$ plane as shown in FIG. 8, a calculated or a graphical determination can be made of the $x_o$ intercept and $-m$ the slope, these determinations being $x_o = 0.0048$ in. and $-m = -1.82 \times 10^5$ lb./in$^3$, from line 72. Then the required beam stiffness is calculated based on a disc diameter of $d = 1.00$ in.

$$K = (\pi d^2/4)(m) = (\pi/4)(1.0)^2 \times 1.82 \times 10^5 = 1.423 \times 10^5 \text{ lb/in}$$

Next, it is required to determine the disc thickness which will realize this stiffness. The relationship between the deflection and load for such a disc is given in the text by R. J. Roark. *Formulas for Stress and Strain* and takes the form:

$$Y = (W/Et^3) C \quad (4)$$

where
$E = 30 \times 10^6$
$W$ is the total load uniformly distributed.
$C$ in in.$^2$ is a constant which depends upon the outside diameter, the hole diameter and Poisson's ratio which is taken to be 0.270. For an outside diameter of 1.0 in.

and a hole diameter of 0.095 in., the value of C is 0.245.

The stiffness is w/y so that the disc thickness can be expressed as follows:

$$t = \sqrt[3]{\frac{WC}{YE}} = \sqrt[3]{\frac{KC}{E}} = \sqrt[3]{\frac{1.423 \times 10^5 \times .245}{30 \times 10^6}} = 0.1052 \text{ in.} \quad (5)$$

Experimental operation of the disc type valve of this invention shows that it, along with the beam-type valves of the companion patent application, compares favorably with the conventional automatic expansion valve in performing the throttling function at low, rated and high load conditions. Since it does not respond to evaporator pressure increases alone, and is open during off periods of compressor operation, it does not impose a limitation of waiting to restart the compressor until equalization of pressures occurs through a bleed port. Fan motor failures are avoided as a problem with this type of valve without any requirement of a pressure relief device. Finally, the simplicity of the construction, and the limited number of parts, should be apparent from the foregoing description.

What we claim is:

1. A refrigerant expansion valve of the type in which a differential pressure across an expansion orifice is used to control the refrigerant flow area of the orifice, comprising: a hollow valve body having refrigerant inlet means and refrigerant outlet means; a disc-shaped deflectable member supported at its periphery from said valve body and separating the interior of said valve body into an upstream space and a downstream space, said deflectable member including means defining generally centered aperture means in said member; stationary structure supported from said valve body and extending into relatively close spacing with said means defining said aperture, means to define a refrigerant expansion orifice therewith so that the upstream face of said deflectable member is subject to the pressure of liquid refrigerant in the upstream space, and the downstream face of said deflectable member is subject to the pressure of expanded vapor refrigerant in said downstream space so the increases and decreases in the differential pressure between the upstream and downstream spaces in the range of pressure encountered in normal operation effect corresponding increases and decreases in deflection of said deflectable member to thereby decrease and increase the effective size of said expansion orifice; said deflectable member being of such configuration and so designed that average refrigerant flow rates will increase and decrease in accord with said increased and decreased pressure differentials.

2. A refrigerant expansion valve including: a valve body including a chamber and having inlet means thereto for receiving substantially liquid refrigerant from a condenser, and outlet means therefrom for discharging substantially expanded vaporous refrigerant to an evaporator; a disc-shaped deflectable member having a central aperture and located in said chamber between said inlet means and outlet means to separate said valve body into an upstream space and a downstream space; stationary structure in said chamber spaced relatively close to the part of said member defining said aperture to define, with said part, an annular refrigerant expansion orifice therebetween; the upstream space in said chamber confining said liquid refrigerant in its passage during service of said valve and subjecting the upstream face of said member to the pressure of said liquid refrigerant, and the downstream space in said chamber confining said expanded vaporous refrigerant in its passage during service of said valve and subjecting the downstream face of said member to the pressure of said expanded vaporous refrigerant, to obtain an increased and decreased deflection of said deflectable member, and correspondingly a decreased and increased effective opening of said orifice, in accordance with increased and decreased differential pressures of said liquid and expanded vaporous refrigerant in the range of pressures encounterd in normal operation; said deflectable member being of such configuration and so designed that average refrigerant flow rates will increase and decrease in accord with said increased and decreased pressure differentials.

3. A valve according to claim 2, wherein: said structure comprises a rim of a generally nozzle-shaped part supported from said valve body.

4. A valve according to claim 2, wherein: said aperture is sufficiently large in cross-sectional area relative to the effective cross-sectional area of said expansion orifice that substantially all of said expansion of refrigerant takes place across said orifice.

5. A valve according to claim 2, including: a plurality of discrete outlets for said expanded vaporous refrigerant from downstream space.

6. A valve as defined in claim 1, wherein said expansion orifice is annular and comprises a surface of said deflectable member and an opposed portion of said stationary structure which is an annular rim.

7. A valve as defined in claim 6, wherein said rim is projected from a wall of said downstream space in said valve body and is chamfered.

* * * * *

UNITED STATES PATENT OFFICE
CERTIFICATE OF CORRECTION

Patent No. 3,973,410   Dated August 10, 1976

Inventor(s) Thomas H. Putman & Francis T. Thompson

It is certified that error appears in the above-identified patent and that said Letters Patent are hereby corrected as shown below:

Column 3, line 67, change "ie" to --is--.

Column 5, line 10, "f3" should be changed to --ft$^3$--.

Column 6, approximately line 38, change equation from "$X_h = (A_h/\pi_n)$, $X = (A/90_n)$" to --$X_h = A_h/\pi_n$, $X = A/\pi_n$--

Signed and Sealed this

Nineteenth Day of October 1976

[SEAL]

Attest:

RUTH C. MASON
*Attesting Officer*

C. MARSHALL DANN
*Commissioner of Patents and Trademarks*